Feb. 1, 1949.    C. H. CRAWLEY    2,460,622
FITTING
Filed Nov. 13, 1944

INVENTOR.
CHARLES H. CRAWLEY
BY
ATTORNEYS

Patented Feb. 1, 1949

2,460,622

UNITED STATES PATENT OFFICE 2,460,622

FITTING

Charles H. Crawley, Cleveland, Ohio, assignor to The Weatherhead Company, Cleveland, Ohio, a corporation of Ohio Application November 13, 1944, Serial No. 563,201

1 Claim. (Cl. 285—210)

This invention relates generally to fittings for hydraulic systems and more particularly to fittings with angularly related intersecting passageways, such as three and four way fittings, and methods of making same.

Ordinarily, the bodies of three way and four way fittings for making connections between flared tubes or between flared tubes and other fluid conduits are forged in one piece and then machined to provide the necessary connecting means and intersecting fluid passageways. In the manufacture of small fittings of this type, it is very difficult to drill the fluid passageways accurately enough to insure that they will intersect at the centers of the fittings. For example, a small fitting may have intersecting passageways only $\frac{3}{32}$ inch to $\frac{1}{16}$ inch in diameter, yet the passageways may be 1½ to 2 inches long. In such a fitting, if the drill should run out only $\frac{1}{32}$ of an inch in drilling from one end of the fitting to the center, the connection with the intersecting passageway might either be severely restricted or not made at all. Also, the forged blanks are relatively expensive and require a substantial amount of machining to produce the completed fittings.

It is accordingly a general object of the present invention to provide fittings with intersecting passageways which can be economically manufactured from bar stock by machining operations carried out in large part on automatic screw machines, the fittings being made of intersecting parts permanently joined together as by copper brazing or other brazing or soldering methods. Another object of the invention is to provide fittings with intersecting fluid passageways in which the passageways can be formed rapidly and economically without requiring any high degree of accuracy. Another object of the invention is to provide such fittings wherein the fluid passageways are enlarged at their intersections, thus eliminating the need for any high degree of accuracy in the machining operations and in assembly, and preventing possibility of restriction of flow at the intersections of the passageways. Another object is the provision of an efficient and economical method of manufacturing such fittings.

Further objects and advantages of the invention will become apparent from the following description of preferred forms thereof, reference being made to the accompanying drawings. The essential characteristics are summarized in the claim.

Figure 1:
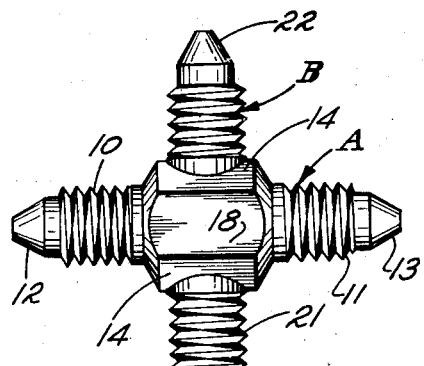
Figure 2:
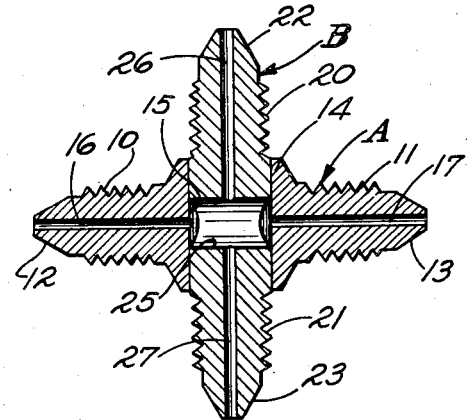
Figure 3:
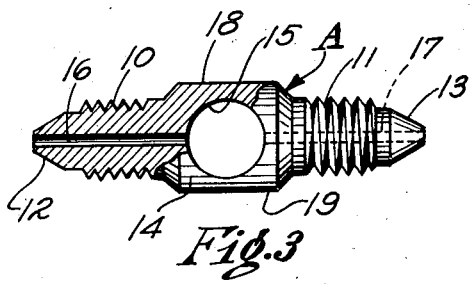
Figure 4:
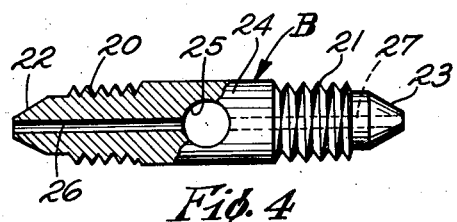
Figure 5:
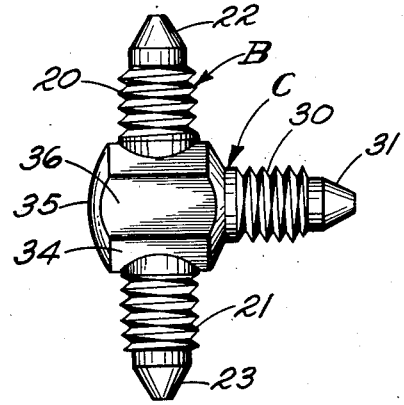
Figure 6:
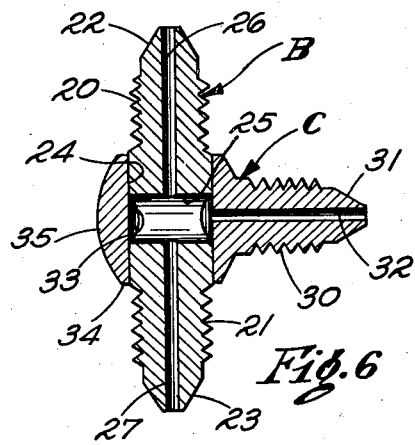

Referring to the drawings, Figure 1 shows a four way flared tube fitting or cross embodying a preferred form of my invention; Figure 2 is a sectional view of the fitting shown in Figure 1; Figure 3 is a view partially in section showing the outer of the two members making up the fitting of Figures 1 and 2, the view being taken at right angles to the plane of Figures 1 and 2; Figure 4 is a view partially in section illustrating the inner of the two members making up the fitting of Figures 1 and 2, the view being taken at right angles to the plane of Figures 1 and 2; Figure 5 illustrates a three way fitting or T made according to a preferred form of my invention; and Figure 6 is a section through the fitting shown in Figure 5.

As shown in Figures 1 to 4, a four way fitting or cross made according to my invention comprises two parts, an outer member indicated generally at A and an inner member indicated generally at B. The outer member A comprises threaded end portions 10 and 11, terminating in conical seats 12 and 13 for engagement with a flared tube. The end portions thus constitute the male parts of conventional flared tube fittings of the S. A. E. type. Between the end portions 10 and 11 there is an enlarged central or body portion 14. The body portion is cross drilled as at 15 to provide a relatively large opening therethrough, while relatively small longitudinal passages 16 and 17 extend through the end portions 10 and 11, respectively, and intersect the transverse bore 15. Opposite faces of the enlarged portion are preferably provided with flat areas 18 and 19 for engagement with a wrench or the like.

The inner member B comprises threaded end portions 20 and 21, terminating in conical seats 22 and 23 so that these end portions, like the portions 10 and 11, constitute the male parts of conventional S. A. E. flared tube fittings. Throughout this application, I have shown flared tube fittings of the S. A. E. type. It will be understood, however, that various other types of fluid connections may be employed, and that various combinations of different types of connectors may be used in the same fitting.

The central portion 24 of the inner member B is cylindrical and preferably has a diameter at least as great as the maximum diameter of at least one of the threaded portions 20 or 21. The central portion is cross drilled to provide a relatively large opening 25, and the end portions 20 and 21 have relatively small longitudinally extending passages 26 and 27, respectively which extend from the centers of the conical seats 22 and 23 and intersect the cross bore 25.

The members A and B are arranged so that they can be joined together permanently and securely and at relatively low cost by furnace brazing or similar processes. Where the parts are composed of steel, I prefer to employ the well-known copper brazing process. To facilitate the brazing operation, the cylindrical portion 24 of the part B has an external diameter substantially the same as the internal diameter of the transverse bore 15 in the enlarged central portion 14 of the member A. Preferably, the diameters of these parts are such that the inner member B makes a light press fit within the bore 15. The parts are assembled as shown in Figures 1 and 2 with the cross bore 25 of the inner member B within the enlarged body portion 14 and preferably substantially aligned with the longitudinal bores 16 and 17 of the member A. No great care need be taken to secure accurate alignment, however, for the bore 25 is substantially larger than the bores 16 and 17, and any reasonably accurate alignment will insure unrestricted communication between the passageways 16 and 17 and the bore 25, even though the bores 16 and 17 deviate within reasonably large limits from the true axis of the member A. After the parts have been assembled as shown, copper is supplied to the contacting surfaces of the parts by any conventional method, for example, by small copper wires surrounding the part B adjacent the body portion 14 of the member A, by electroplating one or both the parts with copper, or by applying a paste or paint containing copper adjacent the contacting surfaces of the parts. The assembled parts, with the copper appropriately supplied thereto, are then passed through a brazing furnace having a controlled atmosphere of hydrogen or other reducing gas. The parts are heated to a temperature of about 2150° F. in the furnace and then permitted to cool while maintained within the reducing atmosphere. At the heat of the brazing furnace, the copper becomes fluid, penetrates the capillary spaces between the adjacent surfaces of the parts and alloys with the underlying ferrous material. Upon cooling, a strong leakproof bond results, and as the parts are cooled in a reducing atmosphere, they come from the brazing furnace bright and clean. Where the parts are composed of a non-ferrous material such as brass, they may be soldered or otherwise joined by an alloy of lower melting point. It will be noted that in the completed article, the copper brazing or other brazing operation produces joints between closely fitting cylindrical surfaces. Thus the only stresses that can be imposed on the bonding material are in shear; and the alloy bond is particularly adapted to resist such stresses.

It will be noted that the cross bores 15 and 25, which are of substantially greater diameter than the longitudinal passageways through the members, provide in effect an enlarged central chamber within the completed fitting at the intersection of the several passageways. The presence of this enlarged chamber eliminates the need for any high degree of accuracy in drilling the several passageways. Thus the machining operations can be carried out rapidly and at relatively low cost. The design of the parts is also such that the parts can be manufactured from inexpensive bar stock by automatic screw machine operations. For example, the part A may be formed from round bar stock having the diameter of the central body portion 14. The end portions may be machined and threaded to the form shown, and the longitudinal passageways drilled from the center of the conical seats 12 and 13 into the central body portion of the fitting, one end being machined, threaded and drilled before the piece is cut off, similar operations being carried out on the other end in a chucking machine. Thereafter, the bore 15 may be drilled and the flat faces 18 and 19 milled or otherwise formed on the body. If desired, hexagonal bar stock of the size of the body portion may be employed, thus eliminating the operation of milling the flats. Thus the piece can be machined rapidly and economically with much of the work being done on automatic screw machines.

The member B may be made from round bar stock in similar fashion, except that the operation of milling the flats on the body is omitted. The amount of machining required in the manufacture of both members is relatively small and there is little waste material. The parts may be machined from bar stock which is inexpensive, yet has the characteristics required in the completed fittings. Because of the low cost of the material, the machining operations and the brazing operation, the assemblies can be produced rapidly and economically.

In Figures 5 and 6 of the drawings, I have shown my invention as applied to a three way or T fitting. Here the member B is constructed just as before, the same reference characters being applied to the member as in Figures 1 to 4, but the outer member indicated in general at C has only a single threaded end 30 terminating in a conical seat 31 and having a longitudinal bore 32 leading to the enlarged transverse bore 33. The body portion 34 terminates shortly beyond the transverse bore 33 in an end face 35. Thus the member C is just like the member A with one of the end portions 10 or 11 cut off. The members are assembled as before with the enlarged bore 25 of the member B in communication with the longitudinal bore 32 of the member C and with the cylindrical surface 24 of the member B bonded to the inner cylindrical surface of the cross bore 33 of the member C. The body portion of the member C is provided with flats 36 for engagement with a wrench, either by milling or by making the member from hexagonal stock, and the member may be manufactured from bar stock by automatic screw machine operations, the only second operation required being the drilling of the cross bore 33.

From the foregoing description of preferred forms of my invention, it will be evident that I have provided fittings which can be manufactured rapidly and economically, with conventional equipment, by the method disclosed herein. The completed fittings are of ample strength, and because of the enlarged central recesses formed by the cross bores in the fittings, there is substantially no possibility of any restriction in flow through the fittings being caused by misalignment of the several intersecting passageways. The fittings shown herein are flared tube fittings of the S. A. E. type. Obviously, other types of flared tube connectors or other connecting means may be incorporated in the fittings. Various other changes and modifications in the invention may be made without departing from the teachings thereof. Therefore, it is to be understood that my patent is not limited to the preferred forms described herein or in any manner other than by the scope of the appended claim.

I claim:

A tube fitting comprising an outer member having an end portion provided with means for connection to another fluid conduit, an enlarged body portion, a transverse bore through said body portion and a longitudinal passage through said end portion intersecting said transverse bore, the diameter of said transverse bore being substantially larger than the diameter of said longitudinal passage, and an inner member having an end portion provided with means for connection to another fluid conduit and a cylindrical portion, a substantially diametric aperture extending through said cylindrical portion and a longitudinal passage through the end portion of said inner member intersecting the diametric aperture of said member, the diameter of the diametric aperture in the inner member being substantially larger than the diameter of the longitudinal passage in the end portion of said outer member, the external diameter of the cylindrical portion of the inner member being substantially the same as the internal diameter of the transverse bore of the outer member, the inner wall of the transverse bore in said outer member being uninterrupted except by the longitudinal passage in said member, the two members being assembled together with the cylindrical portion of the inner member disposed within the diametric aperture bore of the outer member, the transverse of the inner member being disposed within the outer member and in communication with the longitudinal passage of the outer member, and the contacting surfaces of the members being bonded together by a fluid tight alloy bond.

CHARLES H. CRAWLEY.

REFERENCES CITED

The following references are of record in the file of this patent:

UNITED STATES PATENTS

| Number | Name | Date |
|---|---|---|
| 899,582 | Weston | Sept. 29, 1908 |
| 1,668,488 | Boosey | May 1, 1928 |
| 1,964,474 | Lindquist | June 26, 1934 |
| 2,247,420 | Sylvester | July 1, 1941 |
| 2,257,427 | Parker | Sept. 30, 1941 |
| 2,405,010 | Bucknam | July 30, 1946 |